(12) United States Patent
Cutkosky et al.

(10) Patent No.: US 10,875,190 B2
(45) Date of Patent: Dec. 29, 2020

(54) PATTERNED AND INSTRUMENTED DIRECTIONAL ADHESIVES FOR ENHANCED GRIPPING WITH INDUSTRIAL MANIPULATORS

(71) Applicant: The Board of Trustees of the Leland Stanford Junior University, Stanford, CA (US)

(72) Inventors: Mark R. Cutkosky, Palo Alto, CA (US); Wilson Ruotolo, Stanford, CA (US); Jean-Philippe Roberge, Montreal (CA)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 0 days.

(21) Appl. No.: 16/192,188

(22) Filed: Nov. 15, 2018

(65) Prior Publication Data

US 2019/0143532 A1    May 16, 2019

Related U.S. Application Data

(60) Provisional application No. 62/586,736, filed on Nov. 15, 2017.

(51) Int. Cl.
*B25J 15/00* (2006.01)
*B25J 13/08* (2006.01)
*B25J 19/02* (2006.01)

(52) U.S. Cl.
CPC .......... *B25J 15/008* (2013.01); *B25J 13/084* (2013.01); *B25J 13/085* (2013.01); *B25J 19/021* (2013.01); *B25J 19/028* (2013.01)

(58) Field of Classification Search
CPC ........ B25J 15/008; B25J 15/0085; B25J 7/00; B25J 13/08; B25J 13/081; B25J 13/082; B25J 13/083; B25J 13/084; B25J 13/085; B25J 19/02; B25J 19/021; B25J 19/028; C09J 2201/626

(Continued)

(56) References Cited

U.S. PATENT DOCUMENTS 7,762,362 B2    7/2010    Cutkosky
8,065,920 B2 *  11/2011   Park .......................... B25J 7/00
                                                               73/860

(Continued)

OTHER PUBLICATIONS

Le et al. A highly sensitive multimodal capacitive tactile sensor, 2017 IEEE International Conference on Robotics and Automation (ICRA), May 2017.

*Primary Examiner* — Dean J Kramer
(74) *Attorney, Agent, or Firm* — Lumen Patent Firm

(57) ABSTRACT

Gripper pads are provided for use, augmentation or retro-fitting in a robot manipulator. The gripper pads distinguish a dry adhesive layer with dry adhesive wedges that would interface with an object that is desired to be manipulated. The plurality of dry adhesive wedges is organized in a pattern such that the pattern has at least two different orientations for the direction of the plurality of wedges. The gripper pads further distinguish a sensor array underneath the dry adhesive layer. The data obtained from the sensor array provides an estimate of the shape and size of the contact between the gripper pad and the object when the dry adhesive layer is in contact with the object.

8 Claims, 3 Drawing Sheets

(58) Field of Classification Search
USPC .................................................. 294/212, 86.4
See application file for complete search history.

(56) References Cited

U.S. PATENT DOCUMENTS

| | | | |
|---|---|---|---|
| 9,579,801 B2* | 2/2017 | Wettels | B25J 9/1612 |
| 9,731,422 B2* | 8/2017 | Sitti | G03F 7/0002 |
| 2008/0025822 A1* | 1/2008 | Kim | H01L 21/68707 |
| | | | 414/217.1 |
| 2014/0227473 A1* | 8/2014 | Parness | B32B 7/12 |
| | | | 428/64.1 |
| 2014/0272272 A1* | 9/2014 | Spenko | C09J 9/00 |
| | | | 428/113 |
| 2016/0200946 A1* | 7/2016 | Hawkes | C09J 7/00 |
| | | | 428/354 |

* cited by examiner

PATTERNED AND INSTRUMENTED DIRECTIONAL ADHESIVES FOR ENHANCED GRIPPING WITH INDUSTRIAL MANIPULATORS

CROSS-REFERENCE TO RELATED APPLICATIONS

This application claims priority from U.S. Provisional Patent Application 62/586,736 filed Nov. 15, 2017, which is incorporated herein by reference.

FIELD OF THE INVENTION

This invention relates to gripper devices with adhesion-controlled friction.

BACKGROUND OF THE INVENTION

Achieving a stable grasp, while avoiding the application of excessive gripping force, is an important objective for many robotic manipulation tasks. The handling of fragile items, for example, is a case where it is crucial for the robot to minimize forces applied to the grasped object so as to prevent damage. Deformable objects are another class of items where grasping without squeezing is often important to preserve characteristics such as shape or surface properties.

Humans are highly skilled at performing gentle manipulation, for which we rely on our hands' dense array of mechanoreceptors. We quickly adjust our gripping force in response to our estimate of the object's weight and frictional characteristics formed upon initial contact. In reaction to these stimuli, we apply only a minimum force plus a modest safety margin to perform basic manipulations without slippage. This strategy allows us to interact efficiently with fragile and deformable objects. By comparison, most robots have difficulty predicting and maintaining the minimum force required to hold delicate objects.

Many attempts have been explored to improve the ability of robots to handle delicate objects. A large portion of the proposed solutions are control-based, and many have relied on tactile sensors to obtain useful information about gripper-object contact properties. Some proposed preventing slippage by precomputing the required grasping force based on some information that is known a priori about the object. In this vein, it was proposed using tactile sensors to rapidly estimate friction coefficients to determine the minimal normal force needed for a successful grasp. Partially based on this concept, it was proposed using a "tactile exploration" phase to rapidly estimate object-gripper friction using measured tangential force during initial contacts with the object. Although this method has achieved promising results, it also requires a preliminary motion that takes time and still involves an initial, uninformed force application, which could be problematic for especially delicate objects.

Since slippage occurs in two subsequent phases, namely incipient slip and gross sliding, other approaches rely on the active detection of either one or both of these phases to re-adjust the exerted grasping force. This concept is widespread in the art, where different kinds of tactile sensors have been used in conjunction with elaborate control strategies to tune the grasping force. Many of these also show auspicious results; however, their reliance on complex control strategies and fast response complicates the real-time implementation of such solutions in an industrial setting.

In parallel, conformable and adhesive gripping solutions have been proposed using active surfaces inside a gripper to simulate different levels of friction and apply tangential thrust to a grasped item. With their advantages, however, such strategies also introduce moving parts and complexity to the hand, increasing cost and weight and potentially reducing reliability.

As a consequence, despite these advances, most industrial robots still use either parallel jaw grippers or suction cups, often with simple control algorithms, as they have done for over 30 years. This invention addresses these problems in robots and provides a different solution than common in the art.

SUMMARY OF THE INVENTION

Effective handling of delicate objects remains a challenging problem in manufacturing. Instead of using a specialized gripper or control scheme in this invention we present a solution involving gecko-inspired directional dry adhesives that could be affixed to an industrial robot gripper and a tactile sensor. The directional dry adhesives sustain large shear forces with very low pressure. They also release objects without residual adhesion when the grip is relaxed.

It is desirable to predict the maximum forces and moments the gripper can exert without slipping. For this purpose, the tactile sensor provides an estimate of the shape and size of the contact and a force/torque sensor measures the overall force and moment. The force/torque sensor is a separate sensor to allow a robot to know how large the overall force and moment are to lift and manipulate a grasped object. However, such a force/torque sensor would not give any details about the about the contact area between the gripper pad and the object surface, hence the need to require a tactile sensor behind the gripper pads. To resist forces and moments in multiple directions, it is best if the directional adhesives do not all have a single orientation. A chevron pattern strikes a good balance between performance and ease of fabrication.

In one embodiment, the present invention provides a gripper pad for use in a robot manipulator. The gripper pad distinguishes a dry adhesive layer that has a plurality of dry adhesive wedges which would interface with an object that is desired to be manipulated. The plurality of dry adhesive wedges is organized in a pattern such that the pattern has at least two different orientations for the direction of the plurality of wedges. An example of such a pattern is a chevron pattern, but other patterns could work as well.

The gripper pad further distinguishes a sensor array underneath the dry adhesive layer. The data obtained from the sensor array provides an estimate of the shape and size of the contact between the gripper pad and the object when the dry adhesive layer is in contact with the object. The data can be processed by a controller of the robot manipulator to control the force and/or torque applied on the object. In one example, the sensor array measures a pressure distribution between the gripper pad and the object to predict adhesion force and moment by the dry adhesive layer. Examples of sensors in the sensor array are for example, but not limited to, capacitive sensors, piezo-electric sensors, or optical sensors.

In another embodiment, a method is provided of augmenting or retrofitting a robot manipulator with at least two gripper pads. The plurality of dry adhesive wedges of each of the at least two of the gripper pads would be facing each other and face the object that is to be manipulated.

In another embodiment, a control scheme can be considered in conjunction with the gripper pads.

1. If one has some prior information about the object to be manipulated, one can use the equations (1) and (2) given herein to predict whether the adhesive patches should be able to provide enough shear traction and normal force to do the job.

2. Assuming one expects the gripper should be able to do the job, one closes the gripper upon the object while measuring the area and $1^{st}$ polar moment (eq. 4 and eq. 6 shown in U.S. Provisional Patent Application 62/586,736 filed Nov. 15, 2017) to calculate the actual available shear traction and moment that will be possible at each contact patch. The overall force and moment on the object is obtained by a simple free-body diagram force and torque balance where we sum the shear traction and local moment from each gripper pad and resolve their contribution to a coordinate system centered at the robot wrist.

3. Now start to lift and manipulate the object while continuously checking, using the commercial force torque sensor, to ensure that the actual force and moment at the force/torque sensing wrist do not exceed what we know should be possible from step (2) above.

In contrast to prior work, the present invention provides:

(1) a way to optimize an adhesive patch layout to support a combination of forces and moments as would be expected when manipulating and rotating an object (not just lifting it up). The presented chevron pattern is one good example of such a pattern. The present invention teaches more generally how other patterns could be designed for a desired combination of force and moment.

(2) A way to combine commercially available tactile pressure sensor with the adhesive film to obtain an accurate measure of the maximum available force and moment that an adhesive gripping pad will support without slipping at a finger/object contact. This is important for reliable gripping with directional gecko-inspired adhesives.

DETAILED DESCRIPTION

Figure 1:
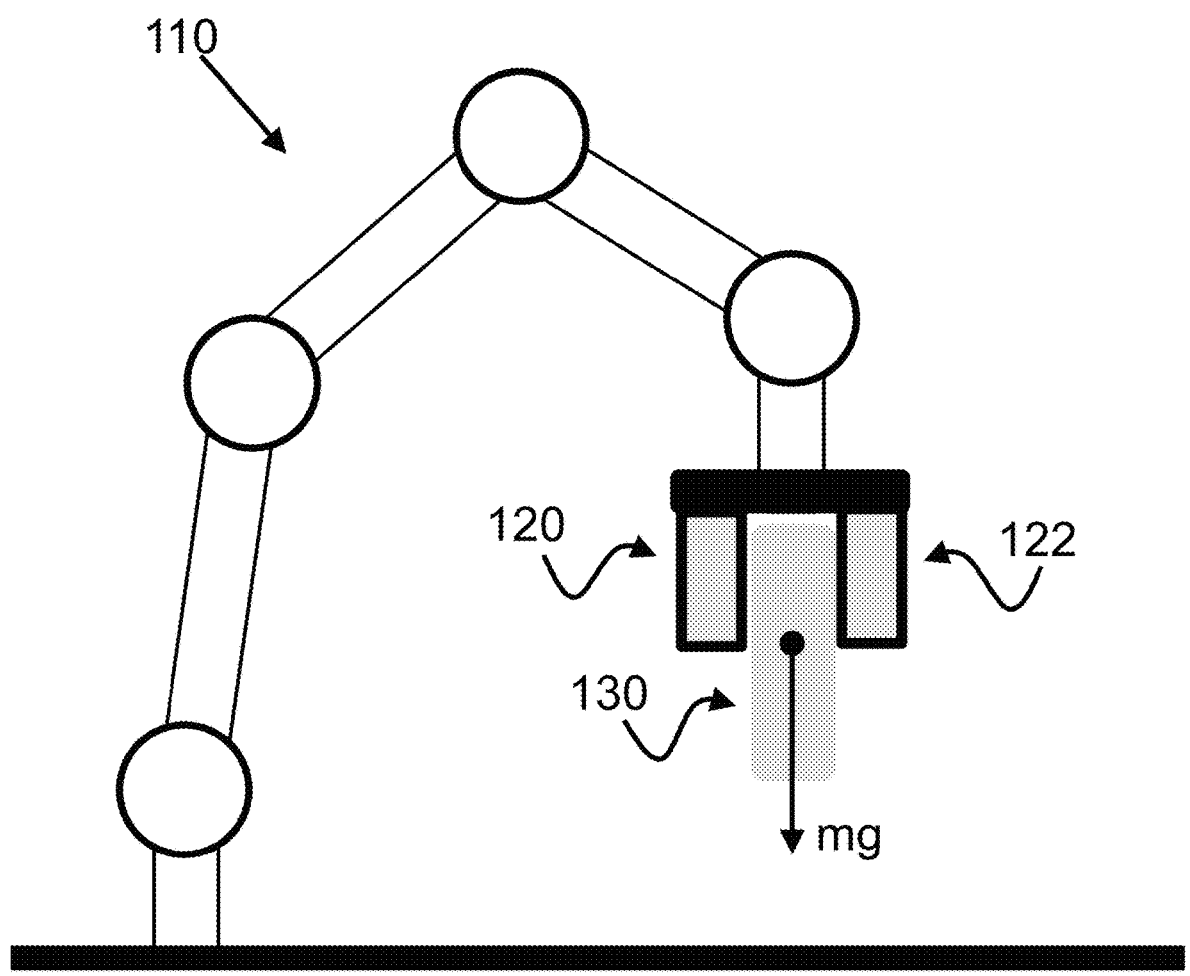
FIG. 1 shows according to an exemplary embodiment of the invention a robot 110 picking up an object 130 with mass m away from its center of gravity. Depending how the gripper pair (120, 122) holds the object a torque is generated in the magnitude of mg times distance d of the center of gravity of the object relative to the gripper.
Figure 2:
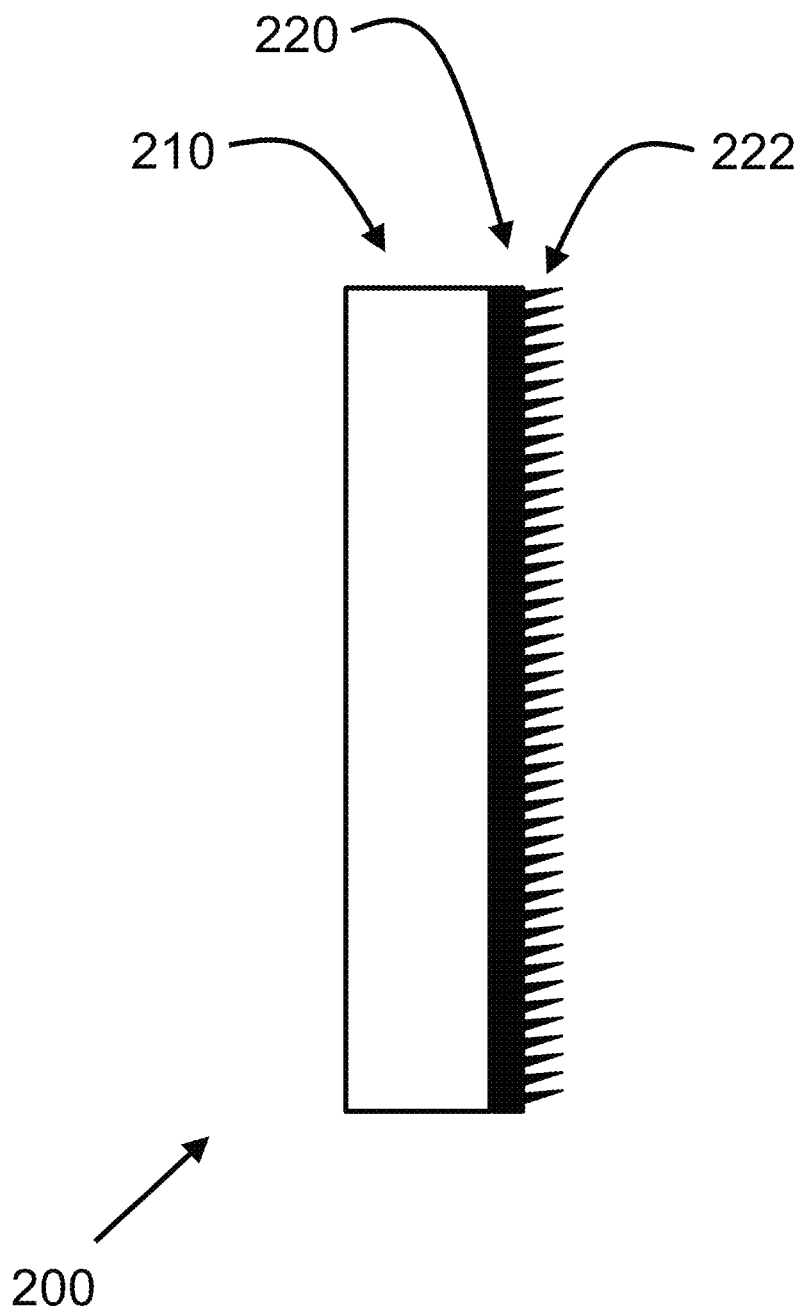
FIG. 2 show according to an exemplary embodiment of the invention a gripper pad 200 with dry adhesive layer 220 with its dry adhesive wedges 222 with under the dry adhesive layer 220 a sensor array 210.

In this invention, we integrate directional, gecko-inspired adhesives into the jaws of a commercial gripper, enabling it to hold very delicate objects. The adhesives are mounted to the outer surface of a tactile sensor, which provides an estimate of both the shape of contact area and the gripping force normal to the contact, and the shear force, which is parallel to the contact, and the moment taken about an axis perpendicular to the contact. All four pieces of information are important for predicting the maximum handling forces and moments that the grip can sustain without slipping. A force/torque sensor at the robot wrist could be added to measure the overall external force and moment.

The solution in this invention is suitable for retrofitting existing industrial robot grippers and uses gecko-inspired adhesives that allow them to handle delicate objects with very low grasp forces. Reviews of gecko-inspired adhesives can be found in (A) Brodoceanu et al., *Hierarchical bioinspired adhesive surfaces—a review,*" *Bioinspiration & Biomimetics*, vol. 11, no. 5, p. 051001, 2016, and (B) Eisenhaure, *A review of the state of dry adhesives-biomimetic structures and the alternative designs they inspire,*" *Micromachines*, vol. 8, no. 4, p. 051001, 2014. Among the many possible solutions, for the embodiments in this invention we desire a material that is directional and highly controllable, meaning the magnitude of adhesion can be controlled, for example, by varying the applied shear or normal force.

In an exemplary embodiment, the particular adhesive material employed is an arrays of 80 μm long, angled silicone rubber "micro-wedges" fabricated on a 25 μm thick polyimide film (Day et al., *Microwedge machining for the manufacture of directional dry adhesives, Journal of Micro and Nano-Manufacturing*, vol. 1, no. 1, p. 011001, 2013). The same adhesive film has been used in a passive gripper for lifting objects purely through shear tractions and in grippers designed to grasp objects in space. In the present embodiments of this invention, we use the film with a small positive normal pressure to provide greatly enhanced friction. The adhesive is capable of gripping with zero normal force (as when used previously on wall climbing robots, U.S. Pat. No. 7,762,362). However, when some positive (i.e. pressing into the gripper pad) pressure is available, the ability of the adhesive to sustain shear forces parallel to the gripper pad improves further. This is particularly true for object surfaces that are not smooth. The effect is similar to having an extremely high coefficient of friction (mu much greater than one), as shown in equation (1) in the paper. The small positive force can be generated by the gripper itself, squeezing very gently upon the object that is between its fingers. The difference compared to ordinary gripping with friction is that a very small normal force (on the order of 0.01 N) is now enough to lift an object weighing 1 kg or more, assuming an adhesive contact area of approximately 2 $cm^2$.

Because the gripping performance depends on both the area of contact and the pressure, we use a gripper equipped with a tactile sensing array. Many tactile sensing technologies are potentially applicable such as capacitive sensors, piezo-electric sensors, optical sensors, or the like. Practical concerns include spatial and pressure sensing resolution, accuracy and robustness. For the exemplary embodiments reported herein we use precommercial version of a tactile array.

Friction with Adhesion

Friction generally has two components: one due to molecular attraction and hysteresis and one due to molecules bumping over each other. The former is an adhesion-controlled component, which depends on the real area of contact at a molecular scale. The latter is a load-controlled component, which depends on the normal force. For most hard materials, the former part is negligible and the latter part provides a maximum friction force that grows linearly with the applied load; hence $f_t \leq \mu f_n$, where $f_t$ is the tangential force, $f_n$ is the normal force and $\mu$ is the coefficient of friction. However, with gecko-inspired adhesives, even in the presence of a normal force, the area dependent part often dominates.

Figure 3A:
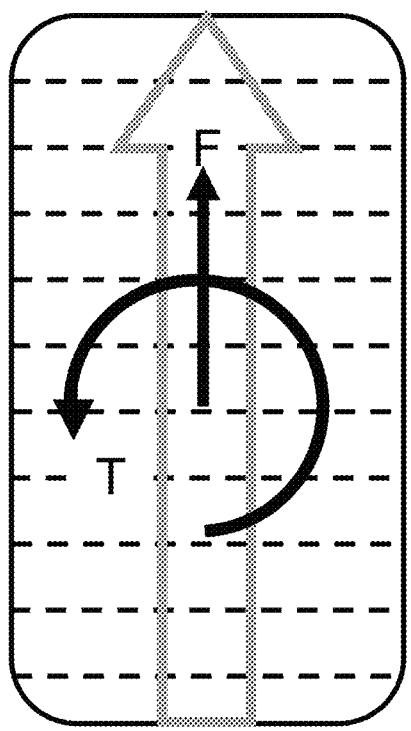
FIGS. 3A-B show according to an exemplary embodiment of the invention force F and torque T generated by a fingertip covered with a uniformly aligned straight wedges (θ=0 degrees, FIG. 3A) and with a chevron pattern with wedges rotated ±θ degrees (FIG. 3B).
Figure 3B:
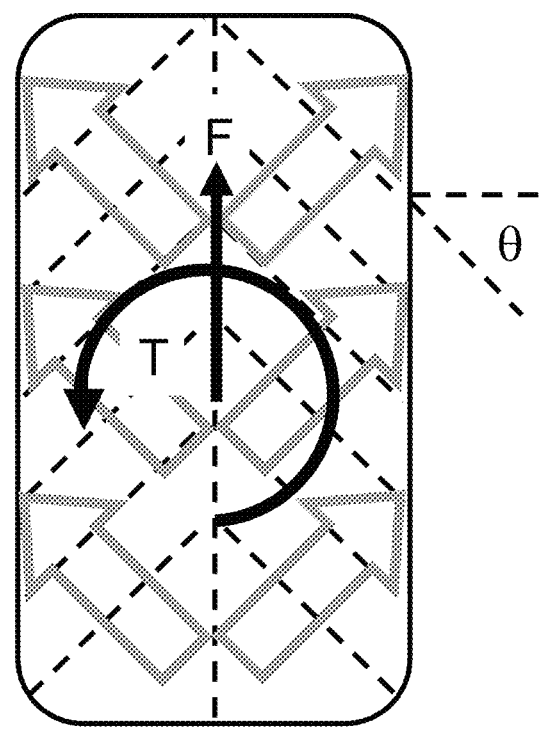

Thus, in static conditions, we expect the tangential force for an adhesive with a positive normal force to follow:

$$f_t \leq \int_A (c_1 p + c_a) dA \quad (1)$$

where p(x, y) is the pressure at a given location of the contact, $c_1$ and $c_a$ are constants and A is the contact area. Similarly, in static conditions, the moment about an axis perpendicular to the fingertip's surface should correspond to:

$$m_x \leq \int_A \|r\|_2 (c_1 p + c_a) dA \quad (2)$$

where r=[x, y] is a vector from the center of pressure of A to each element in A. The embodiments in this invention involve directional adhesives, hence the constant $c_a$ becomes a function of the angle between the preferred loading direction of the adhesive and the angle of the applied tangential force: $c_a(\phi)$. For example, FIGS. 3A-B show two different possible arrangements of directional adhesives. The invention is not limited to these two arrangement examples as a person skilled in the art would be able to optimize other arrangements as well.

Moment Compensation in Manipulation Tasks

If a gripper only needs to exert tangential forces in a single direction, as when lifting objects by grasping at their center of mass, it is most efficient to orient the directional adhesive parallel to the lifting direction. However, manipulation typically involves rotating grasped objects about multiple axes. In addition, the objects may be non-homogeneous, or it may not be possible to grasp them along their centerlines. Consequently, grasp attempts with a single manipulator often introduce a moment about the point of contact with the object, as shown in FIG. 1. With a tight pinch of the object this is perhaps not a problem. However, when attempting to minimize grasping forces there is the potential for slippage. A moment introduces a circular pattern of shear forces around the center of rotation, of which only a small portion is aligned with the adhesive's strongest direction. To compensate for this effect, one can arrange small areas of directional adhesive with multiple orientations. FIGS. 3A-B show the expected results for several different patterns, assuming an adhesive that has maximum strength at $\phi=0$ and minimum strength in the orthogonal directions at $\phi=\pm90$. The grey scale of those plots is distributed linearly with $\phi$, the angle between the load direction and the adhesive's preferred direction, and they show the case where the adhesive has a 70% efficiency when solicited against its preferred loading direction (i.e.: $\phi=180$).

It is also noteworthy from FIGS. 3A-B that θ should in general be adjusted according to the fingertip's dimensions. Furthermore, for optimal moment compensation regardless of tangential force compensation, one should orient the wedges such that:

$$\theta_m = \tan^{-1}\left(\frac{h_f}{w_f}\right)$$

where $h_f$ and $w_f$ are respectively the height and the width of the fingertip's contact area.

Fingertip Design and Construction

In an exemplary embodiment, the gripper is an industrial Robotiq 2-Finger 85 gripper equipped with tactile sensors. The sensor is described in Le et al., *A highly sensitive multimodal capacitive tactile sensor*, in 2017 *IEEE International Conference on Robotics and Automation (ICRA)*, May 2017. This multi-modal tactile sensor is 22 mm by 42 mm and contains a 4-by-7 matrix of taxels. The outer skin of the sensor was replaced by a film with patches of gecko-inspired adhesives in one or more directions (FIG. 1). The adhesive used in these embodiments are rows of inclined "micro-wedges" with a triangular cross section. A characteristic of this adhesive is that the amount of adhesion increases in proportion to the applied shear load. When the shear load is relaxed, the adhesion becomes negligible.

EXPERIMENTAL DATA

The reader is referred to U.S. Provisional Patent Application 62/586,736 filed Nov. 15, 2017, which is incorporated herein by reference, for experimental data and comparisons with other solutions.

The invention claimed is:

1. A gripper pad for use in a robot manipulator, comprising:
   (a) a dry adhesive layer having a plurality of dry adhesive wedges each having a first angled direction extending away from the dry adhesive layer and a second angled direction, orthogonal to the first angled direction, relative to the surface of the dry adhesive layer, wherein the plurality of dry adhesive wedges is organized in a chevron pattern, wherein the chevron pattern has at least two different orientations defined for the second angled direction of the plurality of wedges relative to the surface of the dry adhesive layer, and wherein the dry adhesive layer would be interfacing with an object; and
   (b) a sensor array underneath the dry adhesive layer, wherein the data obtained from the sensor array provides an estimate of the shape and size of the contact between the gripper pad and the object when the dry adhesive layer is in contact with the object.

2. The gripper pad as set forth in claim 1, wherein the sensor array comprises capacitive sensors, piezo-electric sensors, or optical sensors.

3. The gripper pad as set forth in claim 1, wherein the sensor array measures a pressure distribution between the gripper pad and the object to predict adhesion force and moment by the dry adhesive layer.

4. The gripper pad as set forth in claim 1, wherein the gripper pad further comprises a force and torque sensor.

5. A method of augmenting or retrofitting a robot manipulator with gripper pads, comprising the step of:
   augmenting or retrofitting the robot manipulator with at least two gripper pads, wherein each of the two gripper pads has a dry adhesive layer with a plurality of dry adhesive wedges, wherein the plurality of dry adhesive wedges each having a first angled direction extending away from the dry adhesive layer and a second angled direction, orthogonal to the first angled direction, relative to the surface of the dry adhesive layer, wherein the plurality of dry adhesive wedges is organized in a chevron pattern, wherein the chevron pattern has at least two different orientations defined for the second angled direction of the plurality of wedges, and wherein the dry adhesive layer would be interfacing with an object that is to be manipulated, and a sensor array underneath the dry adhesive layer, wherein the data obtained from the sensor array provides an estimate of the shape and size of the contact between the gripper pad and the object when the dry adhesive layer is in contact with the object, and wherein the plurality of dry adhesive wedges of each of the at least two of the gripper pads would be facing each other and the object that is to be manipulated.

6. The method as set forth in claim 5, wherein the sensor array comprises capacitive sensors, piezo-electric sensors, or optical sensors.

7. The method as set forth in claim 5, wherein the sensor array measures a pressure distribution between the gripper pad and the object to predict adhesion force and moment by the dry adhesive layer.

8. The method as set forth in claim 5, wherein the gripper pad further comprises a force and torque sensor.

* * * * *